United States Patent [19]
de Soet

[11] Patent Number: 5,263,841
[45] Date of Patent: Nov. 23, 1993

[54] DEVICE FOR PROCESSING PLASTIC WASTE INTO BLOCKS

[75] Inventor: Antonius H. de Soet, Zuid-Scharwoude, Netherlands

[73] Assignee: Thermopers B.V., Hellevoetsluis, Netherlands

[21] Appl. No.: 814,250

[22] Filed: Dec. 23, 1991

Related U.S. Application Data

[63] Continuation of Ser. No. 522,521, May 11, 1990, abandoned.

[30] Foreign Application Priority Data

May 12, 1989 [NL] Netherlands .......................... 8901198

[51] Int. Cl.$^5$ .............................................. B30B 15/34
[52] U.S. Cl. ..................................... 425/384; 100/92; 100/93 P; 100/240; 425/407
[58] Field of Search ............... 100/92, 93 P, 240, 255; 425/384, 407, DIG. 55; 264/113, 115, 39, 112, 126, 320, 122, DIG. 69; 219/10.71; 428/2; 241/23

[56] References Cited

U.S. PATENT DOCUMENTS

| | | | |
|---|---|---|---|
| 1,640,949 | 8/1927 | Loomis | 425/407 |
| 3,373,966 | 3/1968 | Rowe et al. | 425/384 X |
| 3,375,309 | 3/1968 | Stevens | 425/407 X |
| 3,378,885 | 4/1968 | Dart | 425/407 X |
| 3,383,228 | 5/1968 | Rekate et al. | 100/93 P X |
| 3,589,276 | 6/1971 | Swallert | 100/93 P X |
| 3,671,615 | 6/1972 | Price | 264/39 |
| 3,685,309 | 8/1972 | Harza | 100/93 P X |
| 3,956,541 | 5/1976 | Pringle | 428/2 |
| 4,225,640 | 9/1980 | Erb | 428/2 |
| 4,427,818 | 1/1984 | Prusinski | 524/442 |
| 4,510,363 | 4/1985 | Reynolds, Jr. | 100/92 X |
| 4,860,958 | 8/1989 | Yerman | 100/93 P X |
| 4,935,182 | 6/1990 | Ehner et al. | 264/112 |
| 4,997,609 | 5/1991 | Neefe | 264/122 |

FOREIGN PATENT DOCUMENTS

| | | | |
|---|---|---|---|
| 0055236 | 6/1982 | European Pat. Off. | 100/92 |
| 2166003 | 8/1973 | France . | |
| 2294037 | 12/1974 | France . | |
| 2596688 | 10/1987 | France | 100/92 |
| 80002835 | 12/1980 | PCT Int'l Appl. | 100/92 |
| 2035222 | 6/1980 | United Kingdom | 425/DIG. 55 |

OTHER PUBLICATIONS

WO80/02835, Gullberg, "Method and Apparatus for the Manufacture of Building Structural Blocks", Dec. 1980, 100/92.

Primary Examiner—Richard L. Chiesa
Attorney, Agent, or Firm—Kane, Dalsimer, Sullivan, Kurucz, Levy, Eisele & Richard

[57] ABSTRACT

The present invention relates to a device for processing plastic waste, such as packaging foil of polyvinylchloride, polyethylene, polypropylene etc. into blocks by compressing it in a container. The processing of the plastic waste is achieved by compressing with a punch at a temperature of 120°–180° C. and a pressure of 250–400 g/cm$^2$ and preferably at a temperature of 140°–160° C. and a pressure of 260–290 g/cm$^2$, followed by cooling with air. The cooling is carried out by the introduction of air in the container by a fan, which cooling takes place in 5–15 minutes, and preferably 8–10 minutes. The device of the invention is provided with a punch, whereas the inner surfaces of said container and/or the punch are provided with a coating in order to prevent said softened and compressed plastic waste from adhering to the walls. The coating is preferably teflon, whereas the heating elements advantageously are electrical heating elements.

8 Claims, 1 Drawing Sheet

DEVICE FOR PROCESSING PLASTIC WASTE INTO BLOCKS

This is a continuation of copending application(s) Ser. No. 0/522,521 filed on May 11, 1990 now abandoned.

FIELD OF THE INVENTION

The present invention relates to a process for processing plastic waste, such as packaging foil of polyvinylchloride, polyethylene, polypropylene etc. into blocks, wherein said waste is introduced into a container and said waste is compressed, whereas through the walls and bottom of he container heat is added in order to soften the surface of the plastic waste, followed by cooling, wherein the outer layer solidifies and the obtained compressed blocklike plastic waste is removed, as well as to a device for the application of said process.

BACKGROUND OF THE INVENTION

A similar process and device are essentially known from the French patent application 2, 294,037.

The known process and device do have the disadvantage, that the processing of the plastic waste into blocks is extremely complicated and therefore expensive. The known process has to be carried out in a device, wherein the container for receiving the plastic waste to be processed into blocks comprises a horizontally arranged tube type room, which on both sides is provided with a piston, of which one piston is connected with a guide system and a spring mechanism, whereas the other piston is connected with a hydraulic jack. The walls of said tubelike room, as well as the inner surfaces of said pistons are not provided with a coating resulting in the adhering of the obtained plastic waste blocks to the walls, with the consequence that on the one hand the removal of the blocks is difficult and on the other hand said walls have to be cleaned repeatedly. The cooling of the plastic waste to be compressed into a block occurs by means of a cold liquid, which is run through canals, which are arranged in the walls of the room and/or of the pistons. Furthermore the load opening and discharge opening are the same. The known device has the further disadvantage that said material may get stuck easily during compressing.

SUMMARY OF THE INVENTION

The invention aims now to provide a process and device, wherein the above mentioned disadvantages are removed with success.

In this connection the invention provides a process for processing plastic waste, such as packaging foil of polyvinylchloride, polyethylene, polypropylene etc. into blocks, wherein said waste is introduced into a container, and said waste is compressed, whereas through the walls and bottom of the container heat is added in order to soften the surface of the plastic waste, followed by cooling, wherein the outer layer solidifies and the obtained compressed blocklike plastic waste is removed, characterized in that said compressing of the plastic waste is achieved by means of a punch at a temperature of 120°-180° C. and a pressure of 250-400 g/cm$^2$, followed by cooling with air.

Preferably the compressing takes place at a temperature of 140°-160° C. and a pressure of 260-290 g/cm$^2$.

During heating of the block its outer layer is softened, wherein the plastic particles do melt with each other, followed by cooling of the outer layer in order to solidify the molten plastic particles. The obtained blocks do possess around all a hard outer layer, resulting in a convenient transportation and storage.

Suitably the cooling takes place by the introduction of air into the container by means of a fan. Usually the cooling takes place in 5-15 minutes and preferably 8-10 minutes.

According to another embodiment of the process according to the invention the container, more specifically a series of containers are forwarded by means of a conveyor belt from a loading zone, where the container is loaded with plastic waste and said plastic waste is compressed with a punch at a pressure of 250-400 g/cm$^2$, conveyed through a heating zone, where the container is heated to a temperature of 120-180° C. in order to soften the outer layer of the load, followed by transporting of the container with its contents to and through a cooling zone and then to a discharge zone, where the compressed and shaped load is removed from the container.

Furthermore the invention relates to a device which comprises a container for receiving plastic waste which is to be compressed into blocks and a compressing member cooperating with the container, wherein the walls of the container and/or compressing member are provided with one or more heating elements and cooling means, characterized in that said compressing member comprises a punch, whereas the inner surfaces of said container and/or said punch are provided with a coating in order to prevent said softened and compressed plastic waste from adhering to the walls.

The device according to the invention is relatively uncomplicated.

Instead of two pistons the device according to the invention is provided with only one single punch for compressing the plastic waste to a block. Furthermore there is no spring mechanism, whereas the cooling occurs simply by means of air instead of a cooling liquid, which is run through canals in the walls and the inner surface of the pistons.

Another important advantage of the present device is that the inner walls of the container and punch are provided with a coating, preventing the plastic waste during and after compressing to a block from adhering to the innerside of the device resulting in the mentioned undesired effects.

The coating is preferably TEFLON (TFE), a trademark for the tetrafluoroethylene which has the chemical formula $F(CF_2)_nF$, but other similar materials may be used provided that they are resistant against the prevailing temperature and pressure.

Finally the room wherein the compression of the plastic waste occurs is vertical.

In a favourable embodiment of the device according to the invention the heating elements are electrical heating elements, which are arranged in the walls and bottom of the container and/or in the punch.

According to another embodiment of the device for application of the present process said device is characterized by a conveyor, such as a conveyor belt, by means of which a series of containers arrive from a loading zone, where the containers may be loaded behind each other with plastic waste and said plastic waste may be compressed, may be forwarded through a heating zone where the containers may be heated to a certain temperature, and subsequently said containers may be transported through a cooling zone to a discharge zone, where the compressed and shaped waste blocks may be removed from the containers.

It is noted that the French patent application 2,166,003 also relates to a device for compacting plastic material. Said device is provided with a piston, which in its turn is provided with an elongated middle piece. The material to be compacted is transported by means of a piston to a funnellike device, which is open at its tapered end, so that subsequent to heating and compacting the material leaves the device in the form of a continuous sausage. Herein no blocks are obtained. The inner walls are uncoated resulting in the above mentioned disadvantages.

The invention will be now further illustrated by means of the drawing of two embodiments.

DETAILED DESCRIPTION OF THE PREFERRED EMBODIMENT

Figure 1:
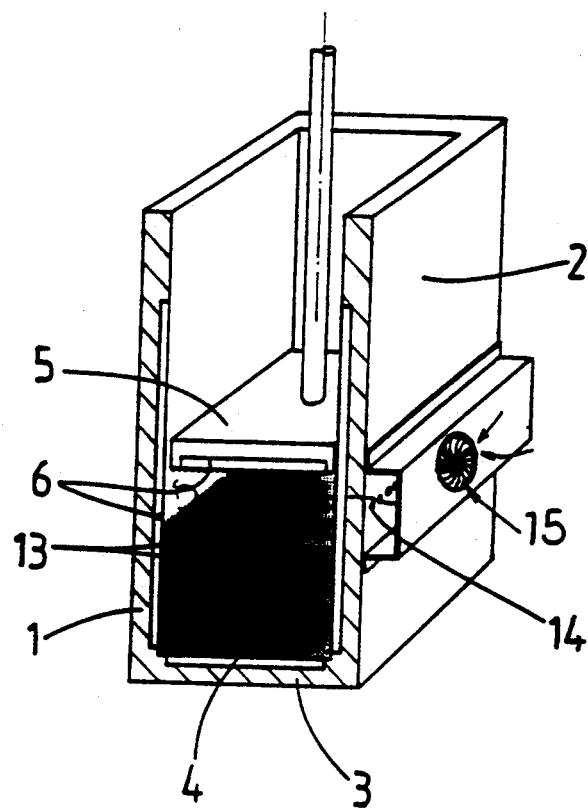
FIG. 1 is a vertical section of a device according to the invention.

As is indicated in FIG. i the container has the form of a rectangular parallelepipedon with a rear wall, a front wall, two side walls 1 and 2 and a bottom 3.

In the room which is formed by the walls and bottom a plastic waste load 4 may be introduced, which may be compressed into a block by means of the punch 5, and wherein the outer surface of the load may be heated to the softening point of the plastic, to wit to 120°-180° C., by means of the electric heating elements 6, which are arranged in the walls and in the bottom of the container as well as in the punch. After a sufficient heating time the compressed plastic waste material is cooled by means of air which is introduced into the container via the orifices 14 arranged in the rear wall of the container. The air is being blown by a fan, which is located at the outer side of the rear wall and is attached to said rear wall. The inner heated parts of the walls are provided with a teflon coating 13. The teflon coating may be replaced by for instance another suitable material.

By compressing, heating and cooling of the load again in the container a form stable block of plastic is obtained.

In the preferred embodiment according to FIG. 1 said front wall comprises a double door. Via the upper door the device is loaded with the plastic waste whereas the punch 5 is in the upper position and the lower door is in the closed position. Subsequent to loading of the device the upper door is closed and the punch is moved downwards in order to compress the plastic waste. After completion of the compression/heating step and cooling the obtained plastic waste block is removed from the device by opening the lower door and by taking away the obtained plastic waste block Suitably the cooling takes place by the introduction of air into the container by means of a fan 15. Usually the cooling takes place in 5-15 minutes and preferably 8-10 minutes. Air is introduced through orifices 14.

Figure 2:
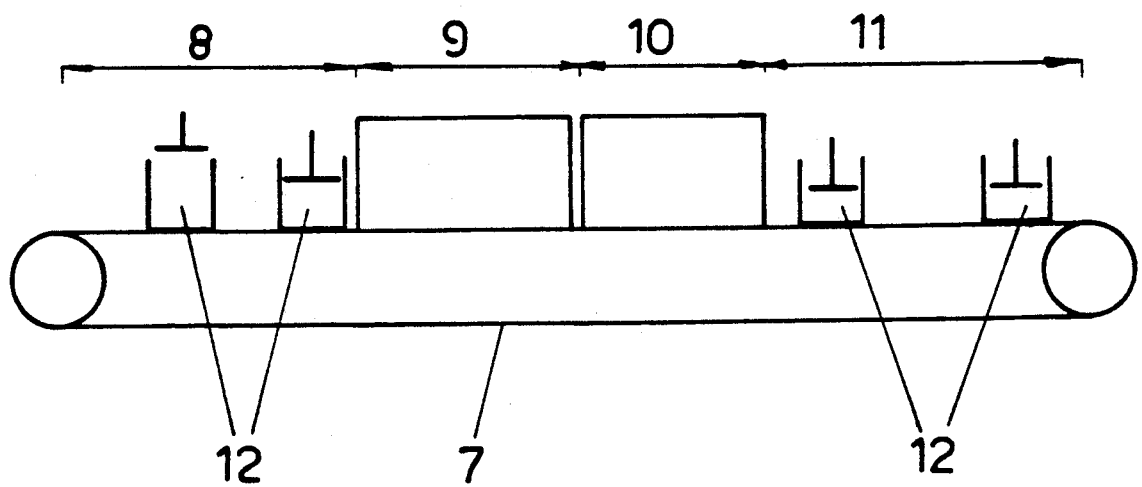
FIG. 2 is a further embodiment of the device for an enlarged capacity.

As schematically indicated by FIG. 2 the device comprises a conveyor belt 7, a loading zone 8, a heating zone 9, a cooling zone 10 and finally a discharge zone 11.

In the loading zone the containers 12, the inner side of which is provided with the coating, may be loaded with plastic waste, which is compressed into blocks in the container followed by transporting it through the heating zone 9, where the blocks do soften and melt at their outer surfaces.

Then the containers are transported through the cooling zone 10 where the processed material solidifies at the outer surfaces of the blocks and wherein the stable blocks of plastic waste are obtained, which finally may be removed in the discharge zone 11 from the containers.

The heating of the containers in the heating zone 9 may occur by means of burners, which are directed to the preferably steel containers and punches.

Then heated containers may be cooled off again in the cooling zone by means of a number of sprinkle nozzles through which cooling water is sprayed against the containers, so that a heating to the softening point and later cooling in a very fast and effective way may occur.

It will be clear that the present invention by no means is restricted to the embodiment as illustrated in the figures.

I claim:

1. A device for processing plastic waste in the form of thermoplastic packaging foil into blocks that are easily handled, transported and stored and having a compressed foil interior and a solidified previously molten outer layer, comprising:

a container in the form of a rectangular parallelepipedon having a rear wall, a front wall, a pair of opposed side walls and a bottom wall, and a punch movable in the container, means for permitting the introduction of the packaging foil into the container;

means for moving the punch in the container to compress the packaging foil in the container;

heating means within both the bottom wall and the other said walls of the container and the punch for raising the temperature to the softening point of plastic particles of the foil to soften the outer layer of the compressed foil and melt the plastic particles of the outer layer of the compressed foil;

cooling means on at least one of the walls of said container for cooling the softened outer layer of the compressed foil within the container to solidify the softened melted plastic particles in the outer layer of the compressed foil;

means for preventing said softened and compressed plastic waste from adhering to the walls;

means for permitting the removing from the container the plastic waste as a compressed block having a solidified hard outer layer and a compressed foil interior for convenience of transportation and storage.

2. The device as set forth in claim 1 wherein the means for preventing said softened and compressed plastic waste from adhering to the walls is a coating upon an interior portion of the device.

3. Device according to claim 2, wherein the coating is TEFLON.

4. The device as set forth in claim 2 wherein the coating upon an interior portion of the device is also upon the inner surfaces of said container.

5. The device as set forth in claim 4 wherein the coating upon an interior portion of the device is also upon the punch.

6. Device according to claim 1, wherein the heating means are electrical heating elements.

7. Device according to claim 1 wherein said device comprises a conveyor, by means of which a series of said containers arranged behind each other from a loading zone, where the containers may be loaded behind each other with plastic waste and said plastic waste may be compressed, may be forwarded through a heating zone, where the containers may be heated to a certain temperature, and subsequently said containers may be transported through a cooling zone to a discharge zone, where the compressed and shaped waste blocks may be removed from the containers.

8. The device as set forth in claim 1 wherein the cooling means is comprised of at least one wall of the container having apertures and a fan which blows air into the container through the apertures.